United States Patent [19]

Gardner

[11] 4,235,126
[45] Nov. 25, 1980

[54] TRANSMISSION MECHANISM
[75] Inventor: Derek Gardner, Hitchin, England
[73] Assignee: Borg-Warner Limited, Letchworth, England
[21] Appl. No.: 920,042
[22] Filed: Jun. 28, 1978
[51] Int. Cl.³ .............................................. F16H 47/08
[52] U.S. Cl. ....................................................... 74/688
[58] Field of Search ........................... 74/674, 682, 688

[56] References Cited

U.S. PATENT DOCUMENTS

| | | | |
|---|---|---|---|
| 3,285,100 | 11/1966 | Peltner et al. | 74/688 |
| 3,426,617 | 2/1969 | Tosi | 74/688 |
| 3,426,618 | 2/1969 | Hau | 74/688 |
| 3,455,185 | 7/1969 | Ohno et al. | 74/688 |

FOREIGN PATENT DOCUMENTS

| | | | |
|---|---|---|---|
| 1480717 | 8/1969 | Fed. Rep. of Germany | 74/688 |
| 2213207 | 10/1973 | Fed. Rep. of Germany | 74/688 |
| 956539 | 4/1964 | United Kingdom . | |

*Primary Examiner*—Henry Jaudon
*Attorney, Agent, or Firm*—James J. Jennings, Jr.

[57] ABSTRACT

A compact automatic transmission of the planetary type adapted for front wheel drive installations including a Ravigneaux gear set and four friction elements whereby 3-forward drive ratios and one reverse ratio may be established, and a first shaft is provided connected directly to the engine and a second shaft being connected to be driven through a hydraulic torque converter. Each of the shafts is connected to drive an element of the gear set whereby a partly hydraulic and partly mechanical drive is provided. In addition, only one friction element need be engaged for each of the ratios established by the transmission.

4 Claims, 2 Drawing Figures

TRANSMISSION MECHANISM

BACKGROUND

The development of automatic transmissions for front wheel drive has included various planetary gear sets which are normally arranged with an output element between the gear set and the engine and including a plurality of friction elements to provide the forward drive ratios. A need has been established to make such transmissions more compact with a minimum of number of elements to establish required ratios. Solutions known to this date usually include a pair of friction elements for each ratio required and normally provide an all hydraulic drive path when a torque converter mechanism is used.

The present invention is adapted to solve the above problem as will be clear from the ensuing description.

SUMMARY OF THE INVENTION

According to the present invention there is provided a transmission mechanism comprising a drive shaft, a hydrodynamic device including an impeller driven by said drive shaft and a turbine output element connected to a turbine shaft, a planetary gear set having a plurality of intermeshing gear elements, said turbine shaft being connected to one of said elements and said drive shaft being connected to another of said elements, a plurality of friction devices connected to certain of said elements and a clutch connected between said drive shaft and said one of said elements whereby a plurality of drive ratios is provided by selective engagement of said friction devices and a direct drive ratio is established by engagement of said clutch only.

Such a construction is capable of overcoming the above mentioned problems in providing a simple and compact transmission by providing a direct drive path from the engine to the transmission and a hydraulic drive path from the engine through a hydraulic torque converter to the transmission whereby a substantial percentage of the drive effort is carried by the direct mechanical path to provide an efficient drive system. In addition, by use of the split power path construction and the fact that the direct drive is obtained by use of both drive paths, a simplified transmission is provided in that only one friction element is required to establish each drive ratio. The simplicity of the transmission enables it to be controlled either by hydraulic means or by electronic means.

DETAILED DESCRIPTION OF PREFERRED EMBODIMENT

Figure 1:
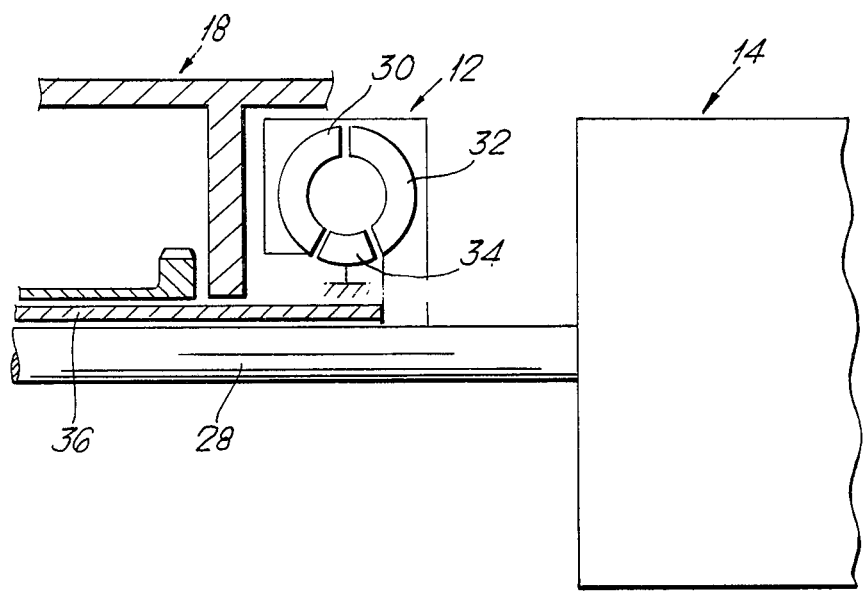
FIG. 1 is a schematic view showing the input drives from the engine of one embodiment of transmission according to the invention.
Figure 2:
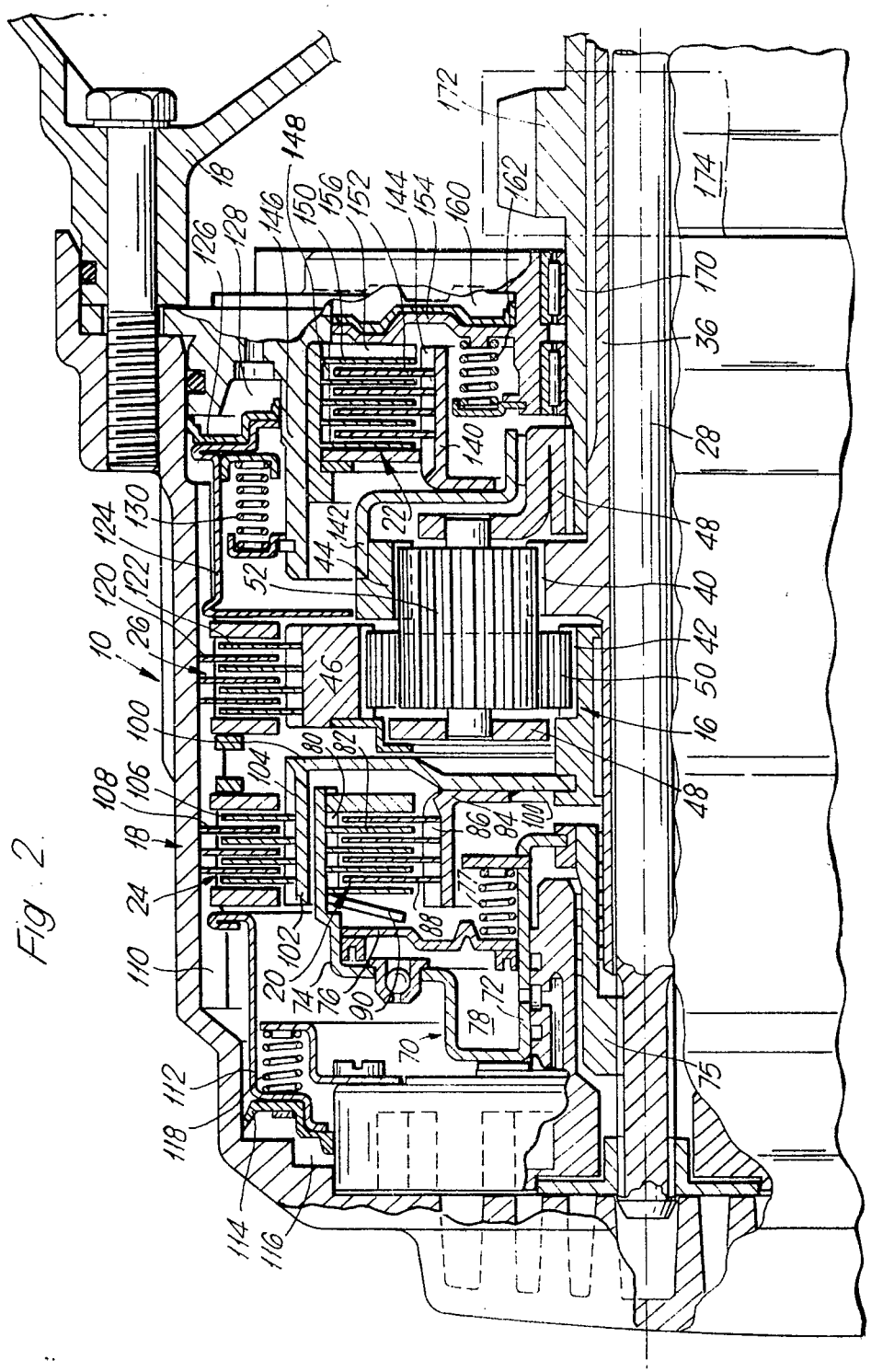
FIG. 2 is a sectional view through a practical construction of transmission mechanism embodying the invention.

Referring to FIGS. 1 and 2, a transmission 10 is illustrated which is well adapted for use in front wheel drive installations. The main elements of the transmission are: a hydraulic torque converter mechanism 12 driven by an engine 14, a Ravigneaux type planetary gear set 16, a housing 18, a direct clutch 20, a low ratio brake 22, an intermediate ratio brake 24, and a reverse brake 26.

Engine 14 drives an engine shaft 28. The engine shaft 28 is connected to drive an impeller element 30 of the hydraulic converter 12. As seen in FIG. 1, the torque converter mechanism 12 is schematically illustrated and includes impeller 30 driven by engine shaft 28, a turbine 32 and a stator element 34. Turbine 32 is connected to drive a turbine shaft 36. The hydraulic torque converter 12 is of a conventional type, as for example, as better illustrated in U.S. Pat. No. 3,859,872 of common assignee.

The planetary gear set 16 includes a first sun gear 40, a second sun gear 42, a first ring gear 44, a second ring gear 46, a planetary carrier element 48 is provided which carries two sets of intermeshing planetary pinion gears. The first set of pinion gears comprises relatively narrow and large diameter gears 50 and the second set of pinion gears comprises relatively wide and smaller diameter pinion gears 52. As indicated, pinion gears 50 and 52 are intermeshing. In addition, pinion gears 52 mesh with sun gear 40 and ring 44 while pinion gears 50 mesh with sun gear 42 and ring 46.

Direct clutch 20 includes a cup shaped sheet metal clutch housing 70 having an inner axial wall 72 and an outer axial wall 74. A tubular stub shaft 75 is provided drivingly connected to engine shaft 28 and to clutch housing 70 whereby clutch housing 70 is driven by engine shaft 28. A sheet metal piston 76 is mounted between walls 72, 74 defining a fluid chamber 78. The wall 74 includes splines 80 which have splined thereto a series of clutch discs 82. A clutch flange 84 is provided having splines 86, which splines 86 are connected to a series of clutch discs 88 which are interleaved with clutch discs 82. A belleville spring 90 is provided mounted between piston 76 and discs 82, 88 which acts as an apply member for applying the clutch in response to axial movement of piston 76 to the right as viewed in the drawing.

Clutch flange 84 is secured by welding, for example, to a radially extending drum 100 which is drivingly connected to sun gear 42 and which has an outer axial flange 102. Axial flange 102 has splines 104 engaged by a series of brake clutch discs 106. Interleaved with brake discs 106 are a series of brake discs 108 which are received by internal splines 110 formed inside housing 18. An annular piston 112 of sheet metal is provided to move brake discs 108 and 106 into engagement which will hold sun gear 42 stationary. Piston 112 has an annular seal 114 secured thereto which defines a fluid chamber 116 in the housing by means of which piston 112 can be moved to the right to engage the brake 24. A series of return springs comprising coils 118 is provided in engagement with piston 112.

Reverse brake 26 comprises a series of brake discs 120 which are connected to splines 110 in housing 18. Interleaved with discs 120 are a series of discs 122 splined to the outer diameter of ring gear 46. A sheet metal clutch piston 124 is provided which is movable to the left as viewed in the drawing to engage brake plates 120, 122 to hold ring gear 46 stationary. Piston 124 includes an annular seal 126 defining a fluid chamber 128 in housing 18. A series of coil return springs 130 is provided for piston 124.

Low ratio brake 22 includes a flange 140 secured to a radial extending support 142 for ring gear 44 and flange 140 has axially extending splines 144 thereon. Housing 18 includes an axially extending portion 146 which defines the chamber for brake piston 124 and further includes internal splines 148 for brake 22. A series of brake discs 150 are secured to splines 148 and interleaved with brake discs 150 are a series of brake discs 152 which are connected to splines 144. An annular piston 154 is provided engageable with brake discs 150 and 152 through an apply member 156 to engage brake 22. Annular piston 154 defines a fluid chamber 160 in housing 18 by means of which the piston can be moved to the left to engage brake 22. A series of coil return springs 162 is provided for piston 154 to return the piston to the right when brake 22 is released.

Planetary carrier 48 is connected to a tubular output shaft 170 which has mounted thereon an output sprocket 172 which is adapted to drive a vehicle differential mechanism (not illustrated) by means of a chain 174. Thus, the output drive from the gear set 16 is to shaft 170 and sprocket 172 from carrier element 48.

OPERATION

The above described transmission is operable to provide three forward-drive ratios and one reverse ratio by means of selective engagement of the friction elements described. As mentioned above, only one friction element is required to be engaged for each ratio. A hydraulic control system, not part of the present invention, would be provided to supply pressure to engage the friction elements in programmed sequence to obtain the ratios at the proper times as in conventional in the automatic transmission field.

First ratio is obtained by engagement of brake 22. With brake 22 engaged, ring gear 44 will be held stationary and turbine 32, being driven by impeller 30, will drive shaft 36 driving sun gear 40. With sun gear 40 receiving drive torque and ring gear 44 held stationary, a simple planetary reduction takes place, driving carrier 48 in the forward direction at a reduced ratio.

Second ratio is obtained by engagement of brake 24 and release of brake 22. With brake 24 engaged, sun gear 42 is held stationary, and with sun gear 40 still receiving drive torque, a forward drive of carrier 48 will take place but at less of a reduced drive ratio than with ring gear 44 held stationary.

Third ratio is obtained by release of brake 24 and engagement of clutch 20. As described above, shaft 28 is driven directly by the engine and, with clutch 20 engaged, shaft 28 is connected to drive sun gear 42. With sun gear 42 driven directly by the engine and sun gear 40 driven by the engine through torque converter 12, the two sun gears 40, 42 are driven at substantially the same rotational speed, locking up the planetary gear set 16 and providing a nearly 1:1 drive ratio. There is an amount of slip in the hydraulic torque converter 12 as will be understood by those skilled in the art. However, this slip is minimal and the difference in rotational speed between sun gear 40 and 42 is not such to significantly vary the 1:1 drive ratio which is established if the two sun gears are driven at the identical rotational speed.

As described earlier, the third and final drive ratio is greatly advantageous with the unique planetary construction of the present transmission, in that a dual drive path is provided wherein, for example, 60 percent of the drive effort is through the hydraulic torque converter path and 40 percent is through the mechanical engine driven path, whereby the normal power loss in an automatic transmission utilizing a hydraulic torque converter (due to slip) is minimized and significantly reduced.

The reverse drive ratio is obtained by engagement of brake 26. With brake 26 engaged, ring gear 46 is stationary and with sun gear 40 driving in the forward direction due to the intermeshing pinions 52 and 50, the carrier 48 will be driven in the reverse direction at a reduced ratio, thereby providing a reverse drive.

As will be apparent, a unique planetary transmission has been provided which utilizes a hydraulic torque converter while reducing the losses therethrough by means of a split power path system, and further the split power path enables a minimum of friction elements to be utilized to obtain the three-forward and one-reverse ratios.

I claim:

1. A transmission mechanism comprising a drive shaft, a hydraulic torque converter including an impeller driven by said drive shaft and a turbine output element connected to a turbine shaft, a planetary gear set having two sun gears, two ring gears, and a planetary carrier having two sets of intermeshing planetary pinions journalled thereon, said turbine shaft being connected to one of said sun gears, a clutch connected between said drive shaft and the other of said sun gears, a plurality of friction brake devices connected to certain of said elements, so that a plurality of drive ratios is provided by selective engagement of said friction elements and a direct drive ratio is established by engagement of said clutch only, a first one of said brake devices being connected to one of said ring gears and engageable to provide a first low drive ratio, a second one of said brake devices for said other sun gear being engageable to provide a second or intermediate drive ratio, said clutch being engageable to provide a third or direct drive ratio, a radially extending drum having one end connected to said other sun gear and its other end terminating in an outer axial flange which forms a portion of the second friction brake device, and a clutch flange member secured to said radially extending drum and having an end portion substantially parallel the outer axial flange of said drum, so that the clutch and second friction brake device are provided in a compact, concentric arrangement.

2. A transmission as claimed in claim 1 wherein said brakes each comprise multiple friction discs.

3. A transmission as in claim 2 wherein an output gear is provided connected to said carrier element.

4. A transmission as in claim 2 wherein said output gear is located between said planetary gear set and said torque converter.

* * * * *